Dec. 5, 1961 A. J. BUSCH ET AL 3,012,099
MESSAGE TRANSMISSION WITH PRIVACY
Filed April 24, 1943 10 Sheets-Sheet 1

INVENTORS: A. J. BUSCH
H. D. CAHILL
O. MYERS
BY H. A. Burgess
ATTORNEY

INVENTORS: A. J. BUSCH
H. D. CAHILL
O. MYERS

BY H. A. Burgess
ATTORNEY

Dec. 5, 1961 A. J. BUSCH ET AL 3,012,099

MESSAGE TRANSMISSION WITH PRIVACY

Filed April 24, 1943 10 Sheets-Sheet 3

INVENTORS: A. J. BUSCH
H. D. CAHILL
O. MYERS

BY H. A. Burgess

ATTORNEY

MESSAGE TRANSMISSION WITH PRIVACY

Filed April 24, 1943 10 Sheets-Sheet 4

INVENTORS: A. J. BUSCH
H. D. CAHILL
O. MYERS

BY H. A. Burgess
ATTORNEY

MESSAGE TRANSMISSION WITH PRIVACY

Filed April 24, 1943 10 Sheets-Sheet 5

INVENTORS: A. J. BUSCH
H. D. CAHILL
O. MYERS
BY H. A. Burgess
ATTORNEY

MESSAGE TRANSMISSION WITH PRIVACY

Filed April 24, 1943 10 Sheets-Sheet 6

INVENTORS: A. J. BUSCH
H. D. CAHILL
O. MYERS
BY H. A. Burgess
ATTORNEY

INVENTORS: A. J. BUSCH
H. D. CAHILL
O. MYERS
BY H. A. Burgess
ATTORNEY

Dec. 5, 1961 A. J. BUSCH ET AL 3,012,099

MESSAGE TRANSMISSION WITH PRIVACY

Filed April 24, 1943 10 Sheets-Sheet 8

A. J. BUSCH
INVENTORS: H. D. CAHILL
O. MYERS

BY H. A. Burgess

ATTORNEY

MESSAGE TRANSMISSION WITH PRIVACY

Filed April 24, 1943 10 Sheets-Sheet 9

INVENTORS: A. J. BUSCH
H. D. CAHILL
O. MYERS
BY H. A. Burgess
ATTORNEY

INVENTORS: A. J. BUSCH
H. D. CAHILL
O. MYERS
BY H. A. Burgess
ATTORNEY

United States Patent Office 3,012,099
Patented Dec. 5, 1961

3,012,099

MESSAGE TRANSMISSION WITH PRIVACY

Aloysius J. Busch, Madison, N.J., and Harold D. Cahill, Scarsdale, and Oscar Myers, Mount Vernon, N.Y., assignors to Bell Telephone Laboratories, Incorporated, New York, N.Y., a corporation of New York Filed Apr. 24, 1943, Ser. No. 484,362
19 Claims. (Cl. 179—1.5)

Figure 2:
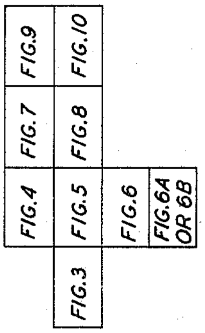

The present invention relates to message transmission with privacy and will be disclosed in the form of a telephone system although the invention is applicable to other types of signaling than speech transmission.

A known type of speech privacy transmission involves dividing speech message waves on a time basis into short fragments and sending these fragments out of their normal order or sequence. Reception is accomplished by rearranging the jumbled fragments, as received, into their normal order or sequence, thereby reconstructing the speech message. The privacy depends upon the difficulty which an outsider may have in finding how to fit the received fragments together to reconstruct the message. If the scrambling or jumbling of the fragments is always according to a certain rule followed over and over again at short intervals, it is only necessary to discover this rule or scheme and use it over and over again to rearrange the transmitted fragments into normal order. If the scrambling scheme is either frequently changed or is continually changed so that there really is no rule or law involved, the difficulty of unscrambling and, consequently, the degree of privacy is greatly increased.

To illustrate this by a simple example, if speech is divided into short fragments occurring normally in the order 1, 2, 3, 4, etc. and is scrambled in sets of five elements so that the sending order is 5, 4, 1, 3, 2; 10, 9, 6, 8, 7; etc. it will be seen that the scheme followed is the same over and over again, and this scheme can be identified as 5, 4, 1, 3, 2. If, however, the first five fragments are sent in accordance with this scheme and the next five fragments are sent in accordance with a different scheme, such as 4, 2, 5, 1, 3 the privacy will be somewhat increased. Assuming a five-element scramble it is easy to write down one hundred and twenty different schemes of which ninety-six may be considered as sufficiently different from normal to be usable for coding purposes. If these be designated as *a*, *b*, *c*, etc. a much longer code cycle than ninety-six is realizable before complete repetition of the cycle begins, by varying arbitrarily the sequence in which these individual schemes or codes are used as, for example, adopting some such order as *a*, *d*, *c*, *a*, *e*, *c*, *b*, *f*, etc. in which the same code is reintroduced in irregular manner.

In accordance with the present invention, mechanical means is provided for scrambling message waves in an arbitrary manner approaching a random order extending over a very long period before repetition of the complete code cycle begins. The invention achieves a high degree of privacy by making it necessary for an outside party to discover the code element by element since there is no recurring scheme of scramble within this long code cycle to enable one to decode the message in long blocks. Moreover, increased irregularity of coding is achieved by using a plurality of independent scrambling mechanisms and interleaving them.

The general object of the invention, therefore, is to provide greatly increased privacy in a system of the general type indicated by providing an extremely irregular and long code cycle.

The successful decoding of the message is accomplished by use of properly coordinated scrambling means at the receiving station operating in step with the scrambling means at the transmitting station, for automatically rearranging the transmitted message fragments into normal form. The possession of such receiver mechanism is a necessary but not a sufficient condition for successful reception of the message, however. For means are provided for arbitrarily changing not only the point in the complete code cycle at which the coding and decoding occur but for altering the coding scheme as well and this is known only to the communicating parties and can be changed from time to time by prearrangement between the parties as they choose.

Figure 1:
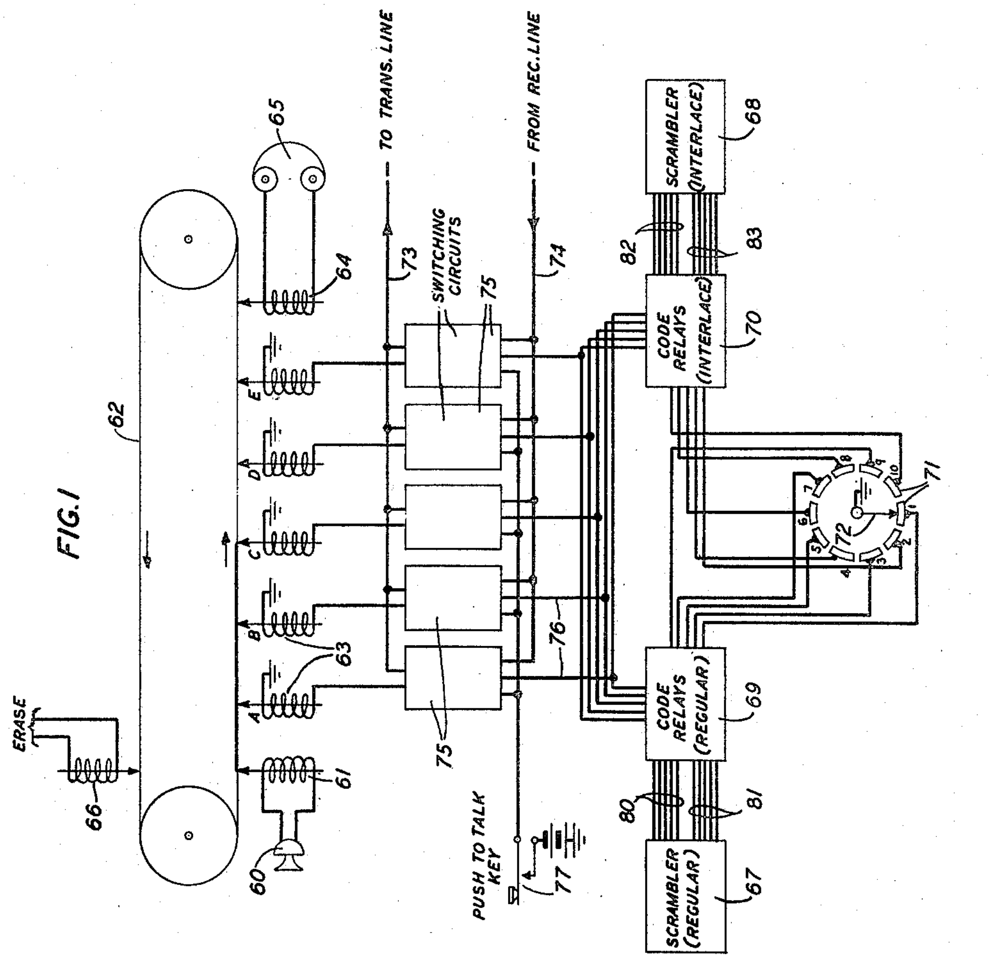

The various features and objects of the invention will appear more fully from the following detailed description of one form of embodiment as illustrated in the accompanying drawings, in which:

FIG. 1 is a simplified schematic diagram or layout of the essential parts making up one complete two-way terminal apparatus according to the invention; and FIGS. 3 to 10 when placed together in accordance with the key diagram of FIG. 2 shows a schematic circuit diagram of so much of the apparatus of FIG. 1 as is necessary for a complete understanding of the system.

Referring first to FIG. 1, the general plan of the system will be outlined. Any suitable type of speech transmitting circuit indicated diagrammatically by the microphone 60 is connected to a recording magnet 61 cooperating with a traveling magnetizable tape 62 traveling in the direction of the arrow. Spaced along the tape 62 at equal intervals are a series of reproducing magnets 63 which pick up the recorded speech with different amounts of time delay. There are five such reproducing coils shown in this figure, although any desired number may be used in practice, and in the more detailed description indicated in the other figures of the drawing nine such reproducer coils will be assumed.

These reproducer coils 63 are used as recording coils in the receiving condition to set up fragments of speech in the tape 62 in such an order that when the recorded material passes over the pick-up coil 64, normal speech is received in the receiver indicated diagrammatically at 65. An erasing coil is indicated at 66. While the tape 62 is illustrated in this figure as running over pulleys it will ordinarily in practice be bound around the periphery of a drum or disc in which case the various recording and reproducing coils will be spaced at regular intervals around the drum or disc.

It is the function of the scramblers 67, 68, code relays 69, 70 and distributor comprising segments 71 and brush 72 to switch the reproducers 63 into the transmitting line 73 in irregular order when speech is being transmitted and to switch them in circuit with the receiving line 74 also in an irregular order when speech is being received such as to restore the speech to normal in the receivers 65. For this purpose five switching circuits indicated by the boxes 75 are provided containing switching circuits individually controlled by the application of ground from the brush arm 72 to segments of commutator 71 and operated code relays over individual leads 76 for individually connecting the coils 63 to either the transmitting or receiving line. The user in talking operates the push-to-talk key 77 which places all of the switching circuits 75 under control of grounds supplied over the leads 76 for connecting coils 63 to the transmitting line 73. When the key 77 is released the switching circuits 75 are conditioned to be operated by grounds supplied over the leads 76 to connect the coils 63 to the receiving line 74. Three speech fragments are assumed to be recorded on the tape (up to coil C) by the time brush 72 reaches commutator segment 1 so as to provide some stored speech for scrambling. With nine instead of five pick-up coils, five speech segments (up to coil E) would be recorded before transmission or reception begins.

One scrambler 67 and one set of code relays 69 are termed "regular," while the other scrambler 68 and the other set of code relays 70 are termed "interlace." The regular set of code relays 69 are wired to commutator segments 1, 3, 5, etc., while the interlace set of code relays are wired to the alternate commutator segments 2, 4, 6, etc. Thus, when the arm 72 sweeps over commutator segment 1 an operated code relay in the regular set 69 extends the ground connection over one of the five leads 76 (determined by the scrambler 67) to connect a particular coil 63 to either the transmitting or receiving line depending upon whether the button 77 is operated or released. As the brush 72 sweeps over commutator segment 2, the ground is extended through an operated relay in the interlace set 70 to a particular lead 76 (determined by scrambler 68) to connect one of the coils 63 to either the transmitting or receiving line. As the brush 72 sweeps over the succeeding commutator segments the coils 63 are switched into circuit alternately under control of the regular and interlace code relay sets.

The scramblers 67 and 68 determine the sequence of operation of the code relays by interconnecting input leads 80 with output leads 81 or input leads 82 with output leads 83 in irregular order for controlling the code relays. The internal construction of the scramblers can be varied widely in practice and may be of any suitable type capable of interconnecting the input and output conductors in an irregular non-recurrent order. In the more complete disclosure shown in the succeeding figures, the scrambler comprises a number of stepping switches in which switch arms are moved across banks of terminals with an irregular or haphazard scheme of wiring between successive switches. By providing an unequal number of contacts on the different switches and connecting them to operate in tandem and with different numbers of switches in tandem at different times and by otherwise varying the scheme of interconnection as will be more fully described, the scrambler is enabled to interconnect the incoming and outgoing leads in an irregular order with an extremely long code cycle. Scramblers 67 and 68 while operating in timed relation with each other generate independent codes so that the interlace scramble is determined entirely independently of the regular scramble, thus further confusing the order in which the speech segments are sent out or received.

It is necessary that the transmitting and receiving codes used in two intercommunicating stations be properly correlated so that the received scrambled message will be successfully unscrambled. The fact that, in transmitting, the scrambling is done in taking the speech segments off the tape (scramble on reproduce) while, in receiving, the unscrambling is done in recording the received speech segments on the tape (scramble on record), makes it possible to use scramblers 67 and 68 at one station which are exact duplicates of the scramblers 67 and 68 used at the opposite station. They are started in phase coincidence with each other at the opposite stations and are run in close synchronism. In practice a single drive may be used at a station for timing the scramblers, moving the commutator brush arm 72 and driving the magnetic tape 62. Synchronism of all of the parts is obtained between the different stations by insuring that the common driving means at one station runs in close synchronism with that of the other station. The present invention is not specially concerned with the manner in which the two driving motors are synchronized since any suitable type known in the art may be employed. It is contemplated, however, that independently operating vacuum tube oscillators of high stability and constancy of operation will be used at separated stations. Such oscillators are capable of running in sufficiently close synchronism with each other for perhaps several hours at a time. In order to maintain sufficiently exact synchronism the transmission may be monitored from time to time and manual adjustments made such as by shifting the phase or frequency of one of the oscillators or by shifting the phase of a driven shaft with respect to the driving shaft by known types of adjustable mechanical coupling devices.

Referring to the more detailed showing, FIGS. 3 to 10, inclusive, when placed together in accordance with the diagram of FIG. 2, show (with the exception of a portion of FIG. 6) only apparatus that is comprised in the regular equipment indicated on FIG. 1. The equipment indicated on FIG. 1 as interlace equipment is substantially a duplicate of the regular apparatus and differs from the regular apparatus only in the internal wiring of the scrambler by virtue of which the interlace scrambler generates a different code from that produced by the regular scrambler. The apparatus in FIG. 6 referred to, which is common to both the regular and interlace equipment, comprises a timing circuit diagrammatically indicated in the lower part of FIG. 6A or in FIG. 6B with one group of leads going to the regular equipment and a separate group of leads going to the interlace equipment as labeled in the figure. In view of the fact that the interlace equipment is a duplicate of the regular equipment, except for the internal wiring of the scrambler, it is deemed unnecessary to illustrate in detail the interlace equipment, particularly since the way in which the interlace equipment is coordinated with the regular equipment will be indicated as the description proceeds.

Figure 4:
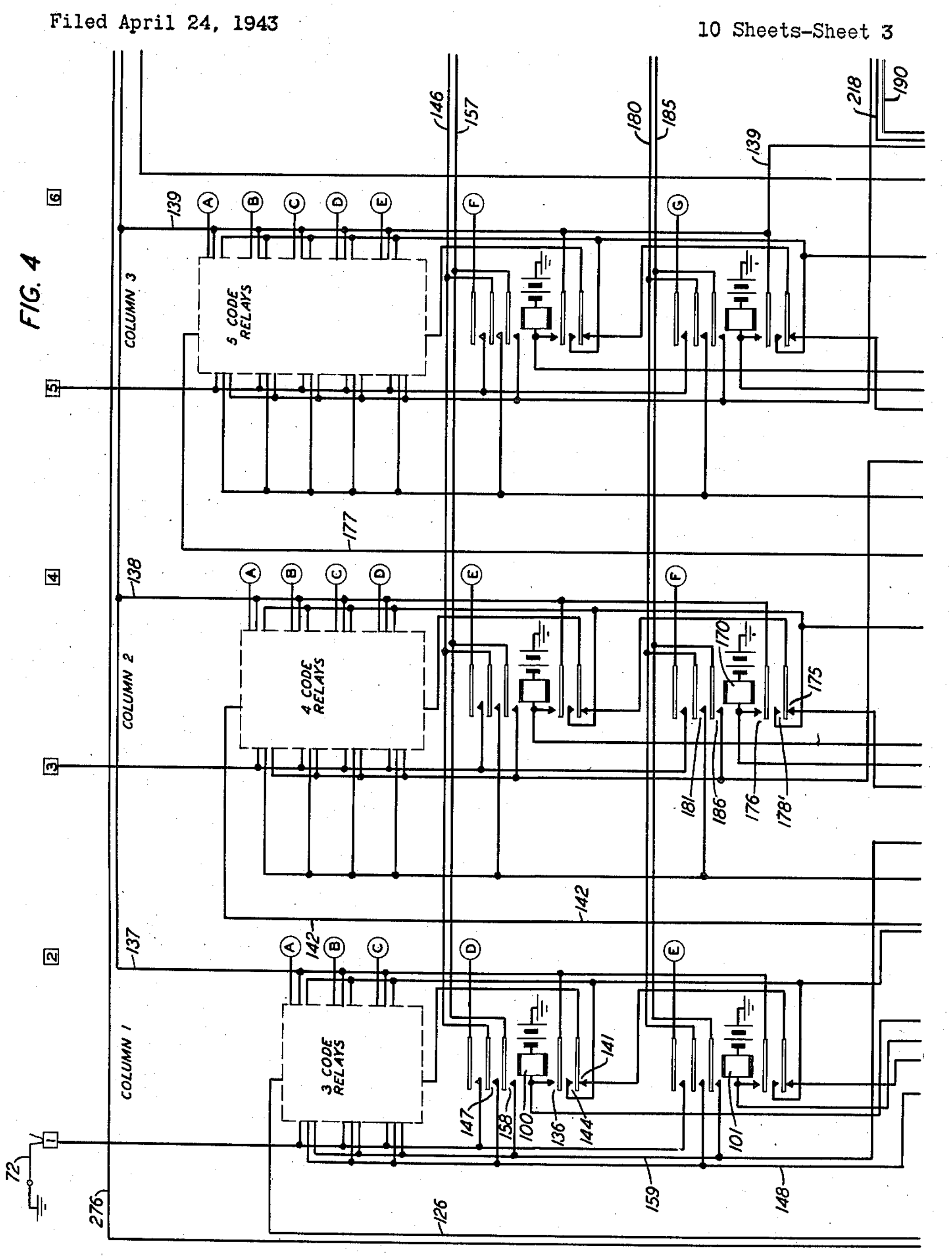
Figure 5:
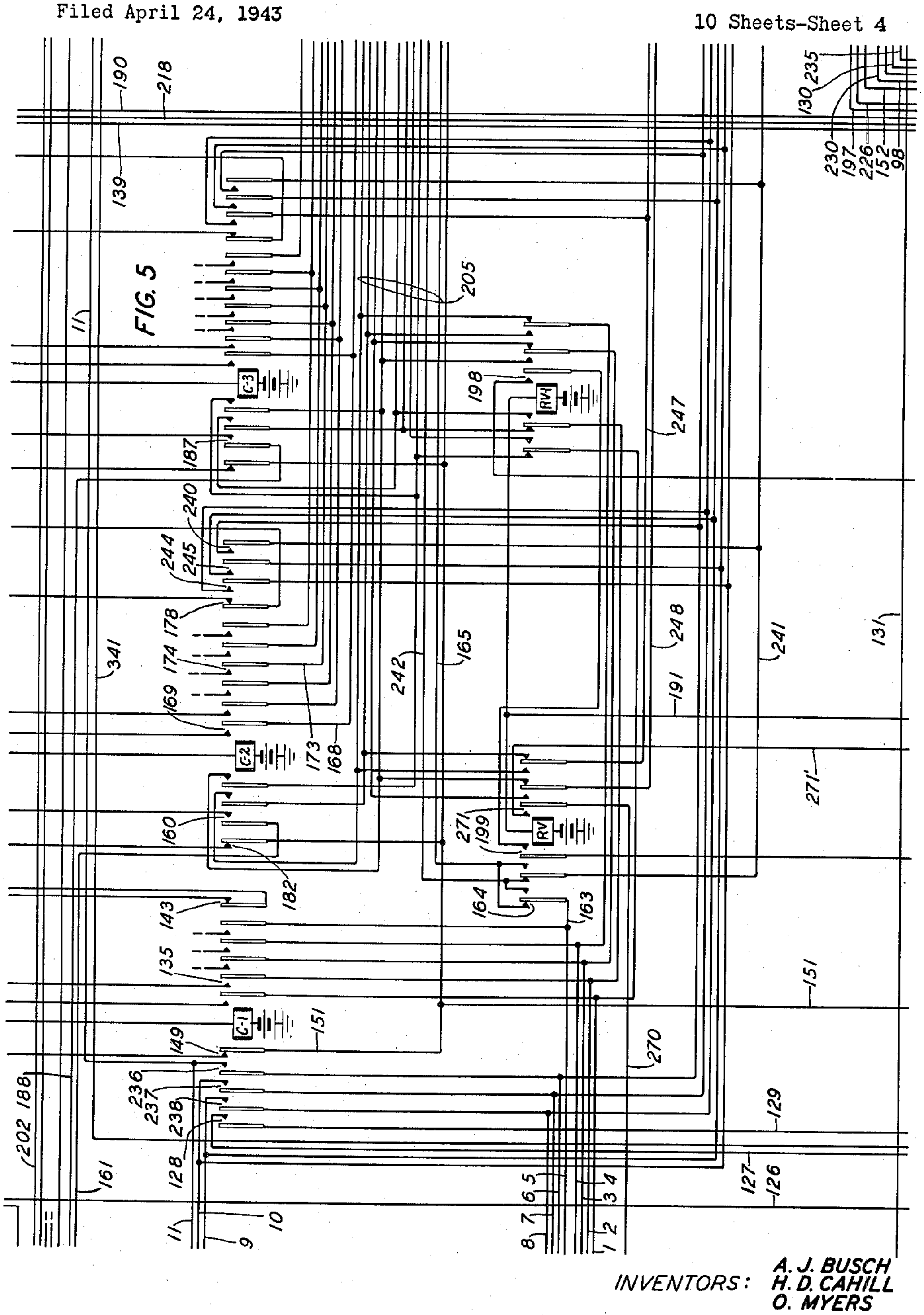
Figure 7:
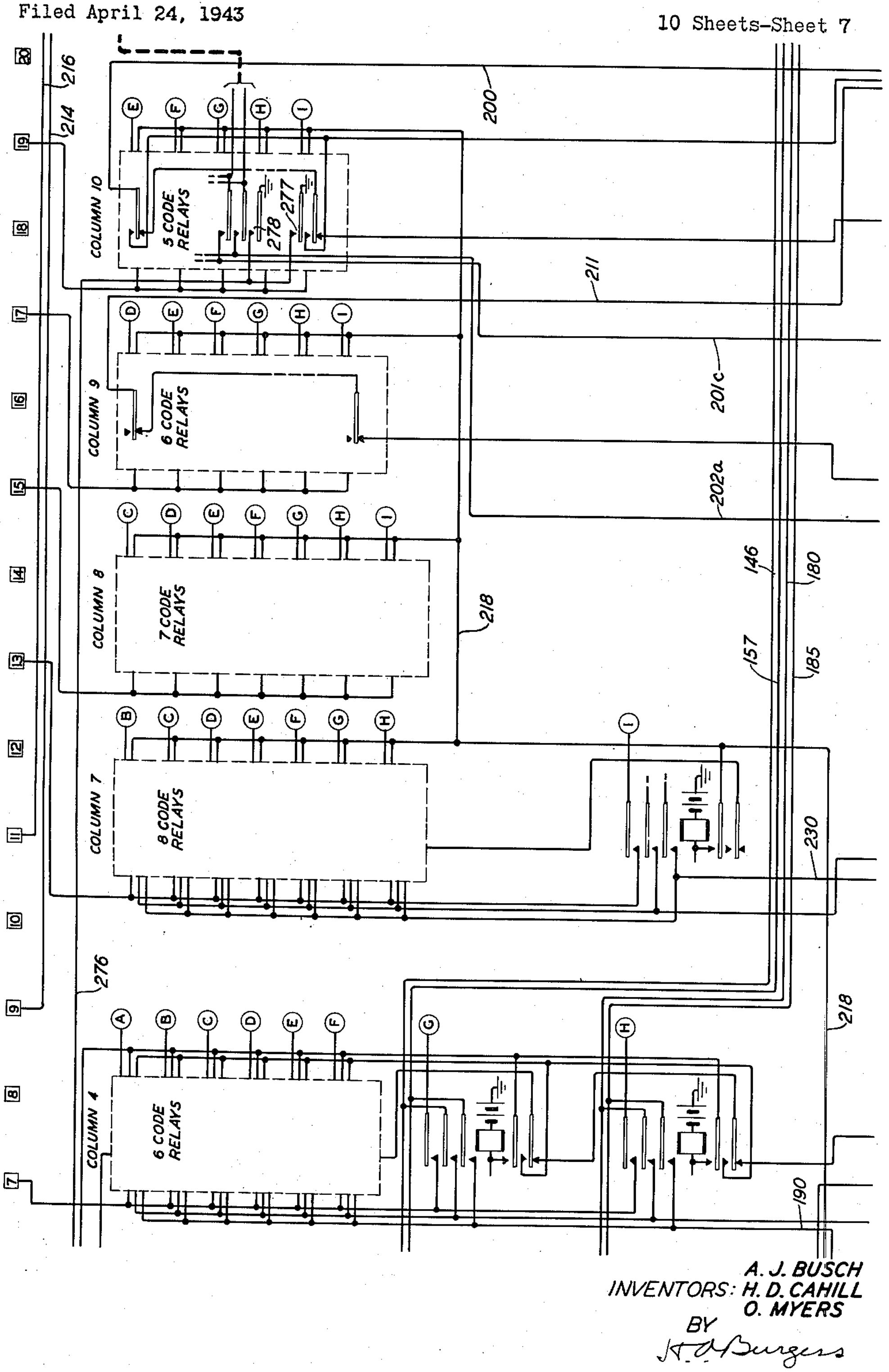
Figure 8:
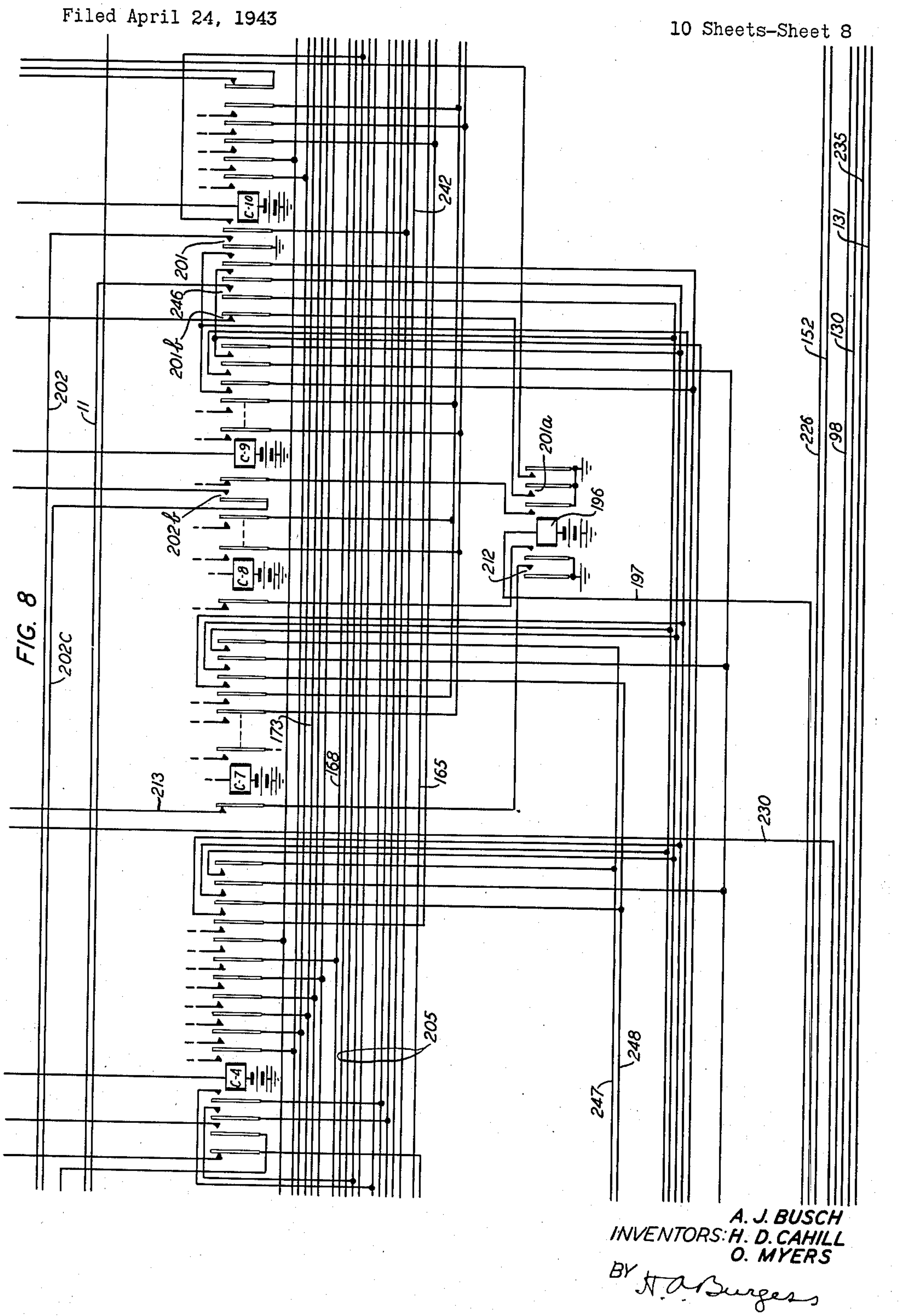

The twenty commutator segments are shown as distributed across the top of FIGS. 4 and 7 and the wiring for the odd-numbered segments is shown in connection with the regular equipment. It will be understood from the description of FIG. 1 that an exactly similar wiring would be used in connection with the even-numbered commutator segments and the interlace equipment, not shown in detail.

Referring to FIGS. 4, 5, 7 and 8, there are eight vertical columns of code relays designated columns 1 to 4 and columns 7 to 10, respectively, and beneath each column of code relays is a column relay designated C–1, C–2, C–3, C–4 and C–7, C–8, C–9, C–10. When any code relay such as relay 100 in column 1 is energized it closes a circuit leading from the corresponding commutator segment, in this case segment 1 through a closed contact of the operated relay to the switching device 75 (FIG. 1) individual to the particular recorder-reproducer coil, in this case coil D. There are five code relays in column 1 two of which are shown in detail at 100 and 101 and the other three merely indicated for brevity, since the wiring of these three relays follows the same scheme as is employed for the two relays shown in detail. Only one of these relays can be operated at the same time. It follows then that commutator segment 1 can be connected by the code relays of column 1 to the switching circuit 75 of any one of the recorder-reproducer coils A, B, C, D or E.

In a similar manner, column 2 contains six code relays two of which are shown in detail and the remaining four indicated. When any one of these code relays is operated, commutator segment 3 can be connected to the switching circuit 75 of the corresponding recorder-reproducer coil A, B, C, D, E, or F. Column 3 includes seven relays two of which are shown and the others indicated and this column serves to interconnect commutator segment 5 with the switching circuit of any one of the recorder-reproducer coils A to G, inclusive. Column 4 contains eight code relays for individually connecting commutator segment 7 to the switching circuit of any one of the recorder-reproducer coils A to H, inclusive. Columns 7, 8, 9 and 10 include, respectively, eight, seven, six and five code relays for individually connecting the respective commutator segments 13, 15, 17 and 19 to the switching circuits of the various recorder-reproducer coils as indicated on the drawing.

In setting up a code combination, code relays in columns 1 to 4 are operated as a first group and code relays in columns 7 to 10 are operated as a second group. The order of operation for the first group is column 1, column 2, column 3 and column 4, while the order of operation of the second group is column 10, column 9, column 8 and column 7. As stated, the sequence is controlled from the timing circuit of FIG. 6 and the wiring from this timing circuit to the interlace equipment is such that a code is being set up on the code relays of the second group of the interlace equipment at the same time that a code is being set up on the code relays of the first group of the regular equipment.

It will be convenient in the description to refer to four timing periods designated four quadrants. Quadrant 1 will arbitrarily be taken as the quadrant during which a code is being set up on the first group of code relays, columns 1 to 4 of the regular equipment. As just stated, a code is also being set up on the second group of code relays, columns 7 to 10 of the interlace equipment. During the second quadrant a code is being set up on the second group of code relays, columns 7 to 10 of the regular equipment, and similarly a code is being set up on the first group of code relays, columns 1 to 4 of the interlace equipment. Once a code has been set up on the code relays these relays remain locked for a sufficient time to allow the brush 72 to sweep over the corresponding commutator segments so as to make use of the code in either transmitting or receiving. For example, the code set up on the first group of code relays of the regular equipment in quadrant 1 is made use of for transmitting or receiving during the second quadrant. This is, of course, also true of the code set up on the interlace equipment during the first quadrant. The locked relays of the first regular group and second interlace group are restored at the end of the second quadrant and are in readiness to have another code set up on them during quadrant 3. Similarly the code that was set up on the second regular and first interlace group in quadrant 2 is made use of during quadrant 3 at the end of which the code relays are restored in readiness to have another code set up on them during quadrant 4.

Figure 9:
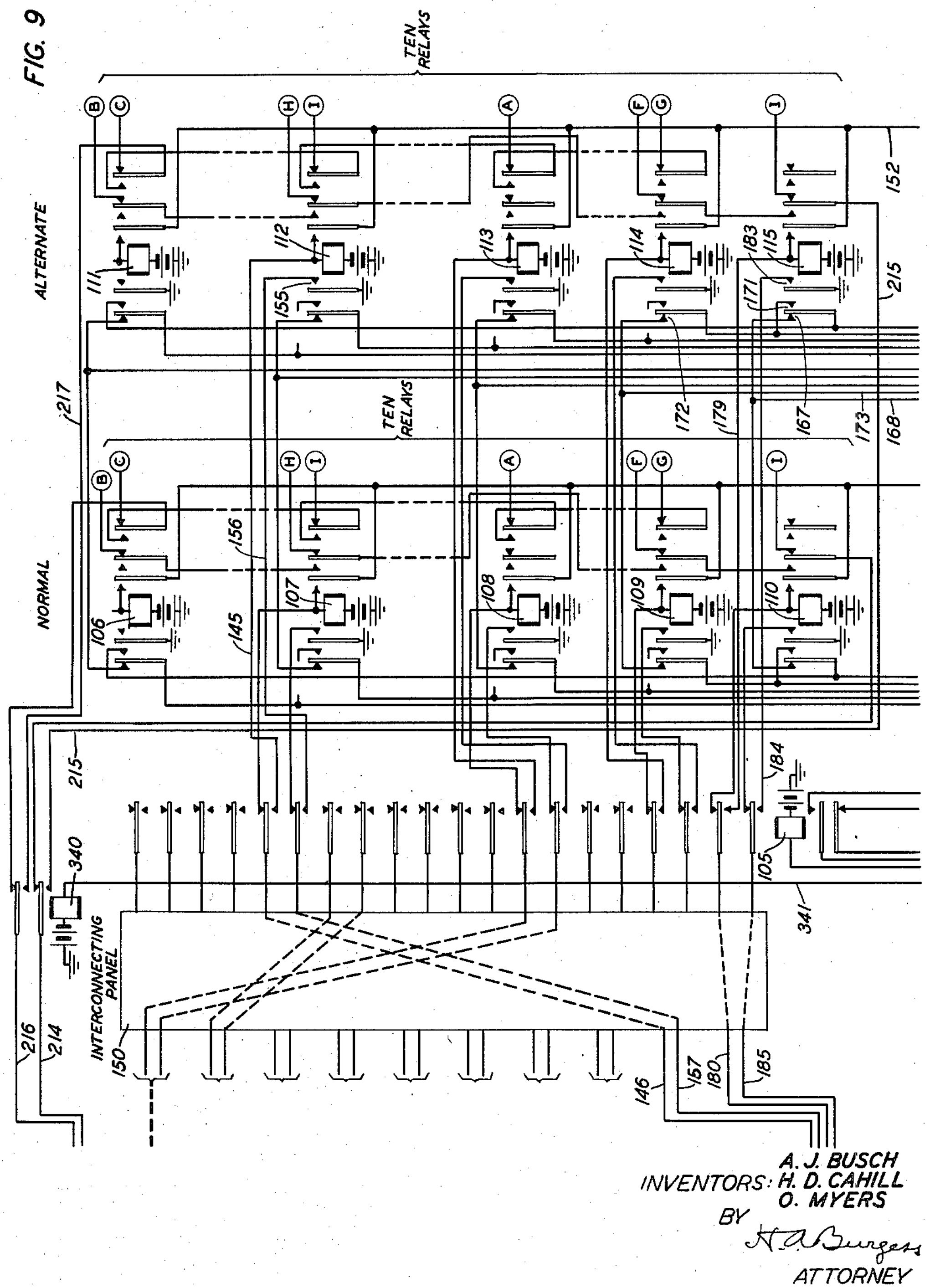
Figure 10:
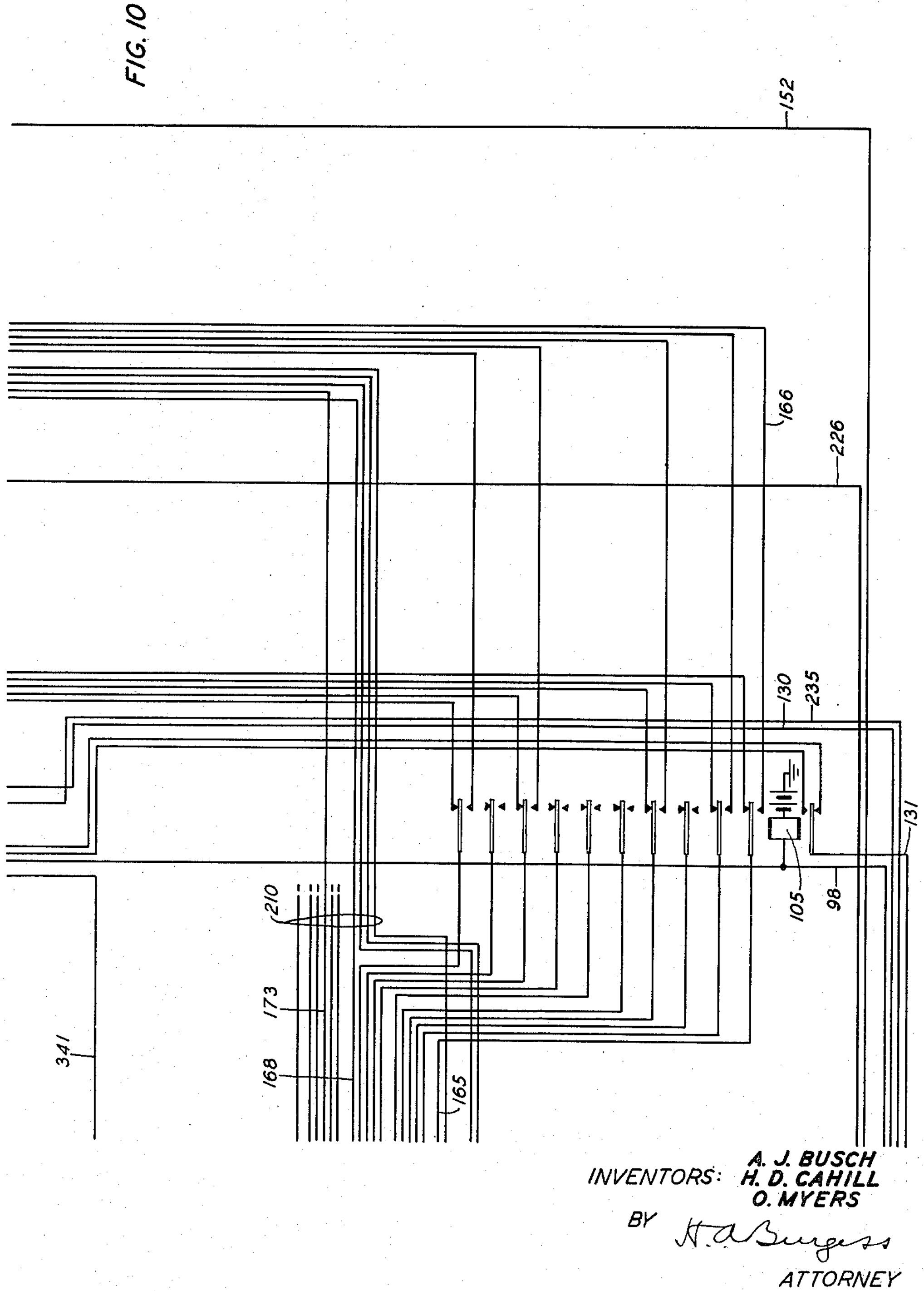

It is necessary to connect the recorder-reproducer coils to commutator segments in such a manner that no speech segments are omitted and that the same speech segment is not repeated. As will be noted below in connection with FIG. 3 the scrambler connects the incoming and outgoing leads in an arbitrary order without reference to which recorder-reproducer coils may have already been selected in the setting up of the code relays for a given code. It is necessary, therefore, to provide a supplementary means for taking the output of the scrambler and reassigning the connections where necessary to avoid either omission of a speech segment or repetition of a speech segment. For this purpose two sets of exclusion relays are provided as shown on FIG. 9. These exclusion relays are used one set at a time in setting up a given code, the set that is used depending upon whether the transfer relays 105, FIGS. 9 and 10, are operated or released. (For simplicity of the showing only two actuating windings for the transfer relay armatures are shown for controlling all of the contacts that are shown arranged in the vertical column above the relay windings on FIGS. 9 and 10, it being understood that in practice a number of such relay windings would be used each controlling a fraction of the contacts shown and that all of the relays would be energized and released together). Each set of exclusion relays comprises ten relays, although for simplicity of the drawing, only five relays are shown in each set. The wiring of each relay of the other set follows directly from the scheme of wiring given for the relays shown. These sets of exclusion relays will be designated for convenience "normal" and "alternate." The normal set is shown on the left and comprises the five relays 106 to 110, inclusive, and five similar relays not shown. These relays are actuated when the transfer relay 105 is deenergized. The alternate set comprising relays 111 to 115 and five similar relays not shown are actuated when the transfer relay 105 is energized. In the setting up of a code on the regular set of code relays columns 1 to 4 and columns 7 to 10, eight of the ten exclusion relays in the alternate group are energized and locked up for a total period of three quadrants, that is, the alternate set is energized during quadrants 1 and 2 and remain locked until the end of quadrant 3. Conversely the normal set of exclusion relays is actuated during quadrants 2 and 3 and remain locked up until the end of quadrant 4. A similar set of normal and alternate exclusion relays together with a transfer relay are provided for the interlace equipment.

It will be noted that commutator segments 9 and 11 are not wired to any of the code relays of FIGS. 4 and 7 but are connected through a pair of armatures of relay 340 to contacts controlled by the exclusion relays. This simplification in the apparatus resulting in the saving of two columns of code relays is permitted by the fact that after the eight columns of code relays are operated there remains a choice of only interconnections between the two remaining commutator segments of the regular set, that is, segments 9 and 11, to the switching circuits of the recorder-reproducer coils. The choice between these two possibilities is determined by which eight out of the ten exclusion relays of the given set have been operated. For example, if in setting up a given code, exclusion relay 111 is not operated, commutator segment 11 is connected to the switching circuit of recorder-reproducer coil C through a right-hand armature and normal contact of exclusion relay 111. If relay 111 were operated, on the other hand, the connection would be passed along through corresponding closed contact of relay 111 to the normal contact of the next unoperated exclusion relay. If such next unoperated exclusion relay were relay 112, recorder-reproducer coil I would be selected. The wiring from commutator segment 9 follows a similar arrangement except that it is carried to the lowermost exclusion relays 110 and 115 and selection is made from the bottom of the column upwards in the order I, F, etc. The order in which the recorder-reproducer coils are connected to the contacts of the exclusion relays is arbitrary.

Figures 6, 6A:
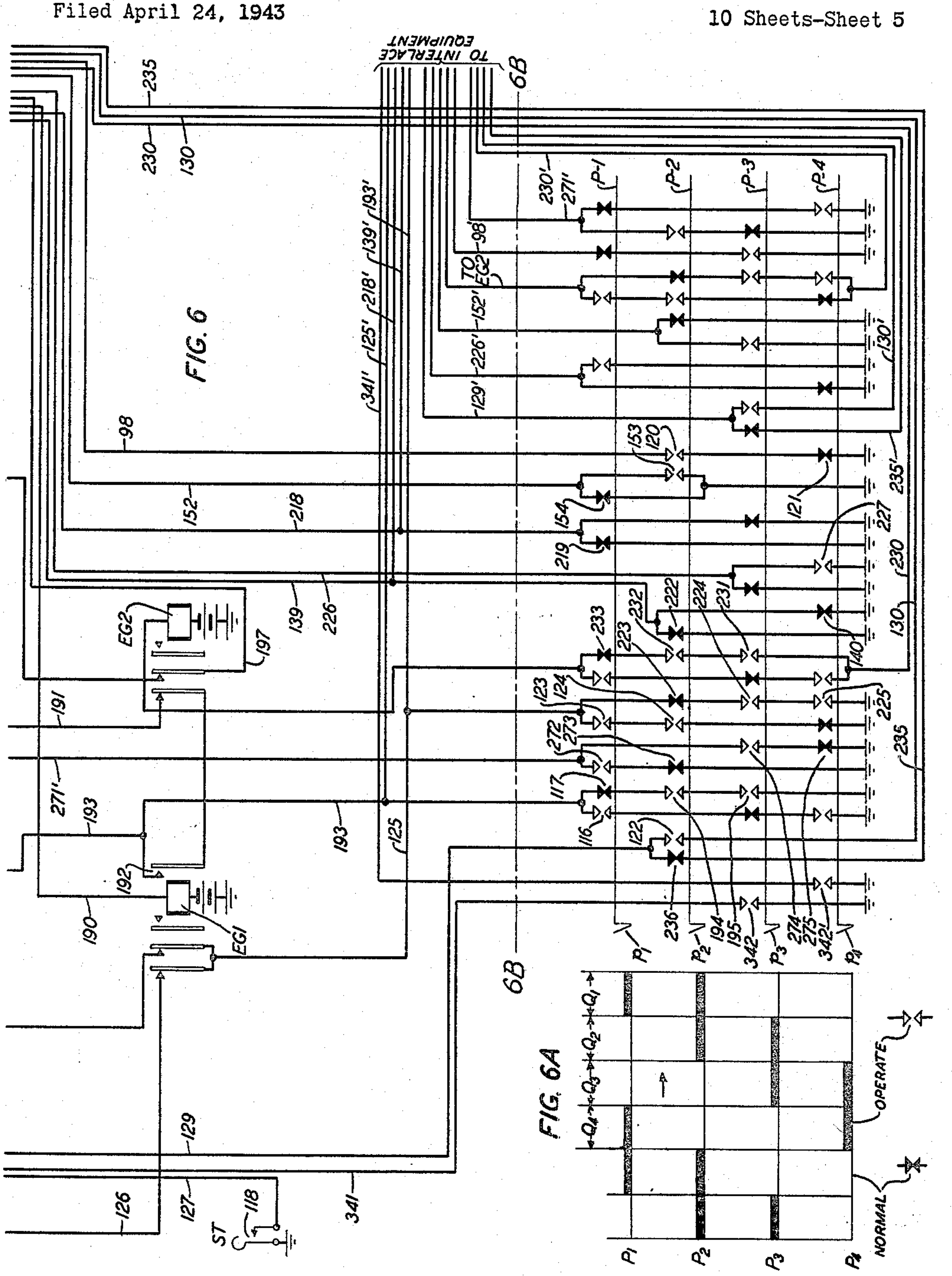
Figure 6B:
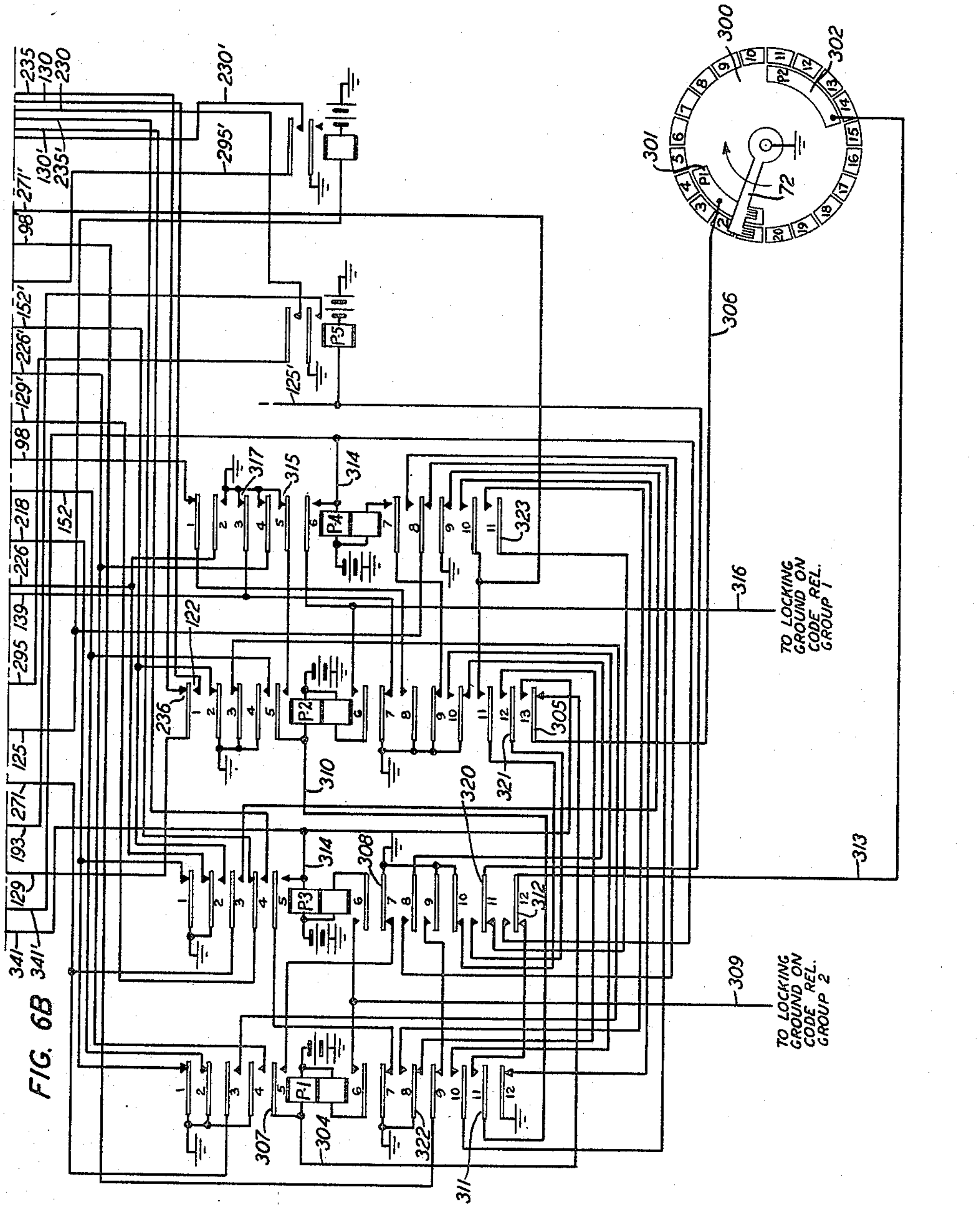

Referring to FIG. 6A, four horizontal rows or sets of contacts P–1, P–2, P–3 and P–4 are shown, the construction being such that all of the contacts in one horizontal row are actuated at the same instant. These contacts are indicated by black arrows in contact with each other to represent a normal circuit closure and by white arrows separated from each other to indicate a circuit that is closed only by operation of a contact member and which is, therefore, normally open. The order in which the contacts are opened and closed may be readily determined from the chart at the left of the rows of contacts, which is assumed to move toward the right and to pass under the points *p*–1, *p*–2, *p*–3 and *p*–4. When a black line of the diagram is passing under a point *p*–1, *p*–2, etc. all of the contacts included in a corresponding horizontal row are changed from the condition indicated in the drawing to the opposite condition, that is, the contacts shown normal (black arrows in contact) are opened while the contacts shown open (white arrows separated) are closed. At the end of the black line and the beginning of a space the contacts in the corresponding horizontal row revert to the condition shown in the drawing. For example, during quadrant Q–1 contacts 116 will be closed, while contacts 117 will be opened. During quadrants Q–2 and Q–3 the contacts 116 and 117 will be as shown, with 116 opened and 117 closed. The physical arrangement for actually operating these contacts may take on various forms. For example, the solid line portions of the timing chart may be raised portions of a cam which when passing under points *p*–1, *p*–2, etc. raise a set of springs to make contacts, such as 116, and break contacts, such as 117. Other means may be readily visualized, such as relays with front and back contacts and with their actuating windings connected in circuits that are closed by a rotating circuit maker, or otherwise. Such a relay circuit is illustrated in FIG. 6B which will be described later on.

Figure 3:
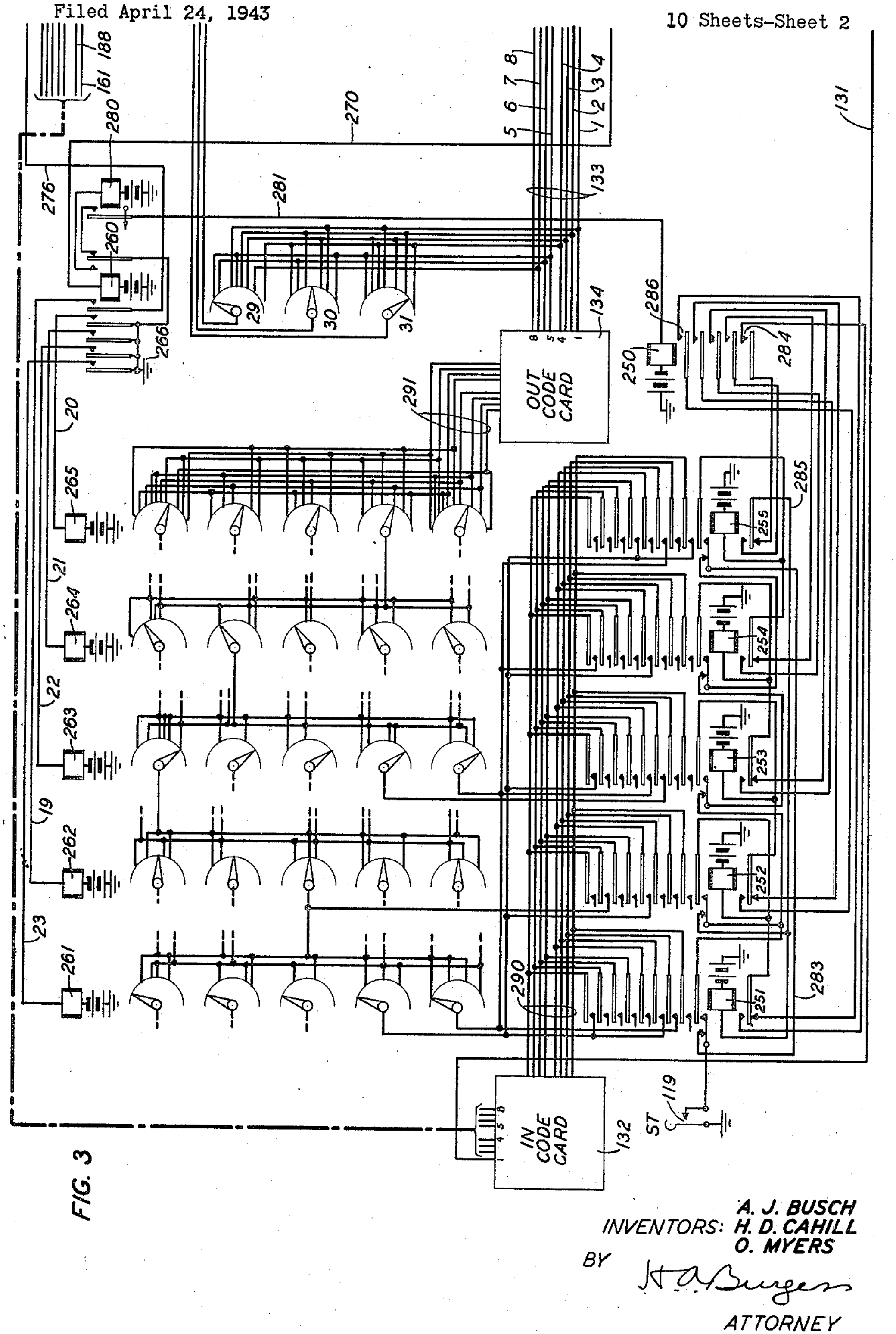

A start key having one spring shown in FIG. 6A at 118 and another spring shown in FIG. 3 at 119 is actuated to close ground through the key and this key remains operated during the entire period of operation. Starting at the beginning of quadrant Q–1 of FIG. 6A, transfer relays 105, FIGS. 9 and 10, are energized since circuit 98 is closed by the operated contacts 120 of set P–2 and normal contacts 121 of set P–4, FIG. 6A. Contacts 122 of set P–2 are also operated. Also during this time contacts 123 of set P–1 and contacts 124 of set P–2 are operated, closing an energizing circuit for column relay C–1, extending from ground through closed contacts 123 and 124, conductor 125, left-hand normal contact of relay EG–1, conductor 126, normal contacts of all five code relays of column 1 in series to the winding of column relay C–1. A circuit is now closed from ground at the start key 118 over conductor 127, closed contact 128, conductor 129, closed contact 122, conductor 130, operated contacts of transfer relays 105 in series, conductor 131, to terminal 1 of the In code box 132 of the scrambler. This ground is traceable through the scrambler circuit in a manner to be described in detail at a later point to one of the eight output leads in the group 133 from the Out code box 134. For example, the path taken through the scrambler for a given setting of the selector switches may be such that the path continues on conductor 2 of the output group 133. This ground, therefore, is extended through conductor 2, closed contact 135 of relay C–1 to the energizing winding of code relay 100, causing that relay to operate. Relay 100 closes a locking circuit for itself over contacts 136, conductor 137, conductor 138, conductor 139 and normal contacts 140 of set P–4 (FIG. 6A) to ground. Relay 100, in operating, opens normal contacts 141, causing relay C–1 to release. Two actions then follow. First, an energizing circuit for column relay C–2 is closed through the winding of the relay, normal contacts of all six code relays of column 2, conductor 142, normal contacts 143 of relay C–1, closed contacts 144 of code relay 100, normal contacts of the relays in code column 1 above relay 100 to ground over conductor 126 as previously traced. Second, an energizing circuit is closed for exclusion relay 112, extending through the winding of that relay, conductor 145, closed contact of transfer relay 105, through the interconnecting panel 150 to conductor 146, operated contact 147 of relay 100, conductor 148, normal contact 149 of relay C–1, conductor 151, normal contact of relay EG–1, conductor 125, contacts 123 and 124 to ground. Relay 112 locks up over common locking conductor 152, closed contacts 153 of set P–2 to ground. This locking circuit remains closed as long as either contact 153 is operated or contact 154 is normal, that is, for quadrants 1, 2, and 3. Relay 112, in operating, closes through its contacts 155 a ground circuit for supplying ground to the scrambler, this circuit extending over conductor 156, closed contact on the transfer relay, interconnecting panel 150, conductor 157, closed contacts 158 of relay 100, conductor 159, closed contacts 160 of relay C–2 and conductor 161 leading to terminal 2 of the In code box 132. This ground will be extended through the scrambler to an output terminal of the Out code box 134, the output terminal depending upon the setting of the scrambler switches. It will be assumed, for example, that this ground at the time under consideration carries through to output conductor 5. This ground is thereby extended over conductor 163, normal contact 164 of relay RV, conductor 165, operated contact of transfer relay, conductor 166, normal contact 167 of exclusion relay 115, conductor 168, closed contact 169 of relay C–2 to the winding of code relay 170, causing that relay to energize. (Retracing this last circuit, if exclusion relay 115 had been energized, the circuit traced through its normally closed contact 167 to conductor 168 would now be traced over operated contacts 171 to contacts of relay 114. If relay 114 is energized, the circuit is transferred to the next higher relay in the column. If relay 114 on the other hand is not energized, the circuit continues through normal contacts 172 of relay 114, lead 173 to closed contacts 174 of relay C–2 to the winding of a corresponding code relay, column 2.)

When relay 170 energizes in the manner described it opens the energizing circuit for relay C–2 at normal contacts 175, causing relay C–2 to release. Meanwhile relay 170 locks up to conductors 138 and 139 through operated contacts 176. Relay C–3 now operates over a circuit including normal contacts of the code relays, column 3 in series, conductor 177, normal contacts 178 of relays C–2, closed contacts 178 of relay 170, normal contacts of the code relays, column 2, above relay 170 to conductor 142 and thence to ground over normal contacts 143 of relay C–3, closed contacts 144 of code relay 100, conductor 126 and the circuit previously traced to contacts 123 and 124 of the timing circuit. Also, relay 170 in energizing closes an energizing circuit for exclusion relay 115, extending through the winding of this relay, conductor 179, operated contact of transfer relay, interconnecting panel 150, conductor 180, closed contacts 181, normal contacts 182 of relay C–2, conductor 151 normal contact of relay EG–1, conductor 125 to contacts 123 and 124 of the timing circuit. Exclusion relay 115 locks up over conductor 152. Exclusion relay 115 now supplies a ground through its closed contacts 183 over conductor 184, contact of transfer relay, interconnecting panel 150, conductor 185, closed contacts 186 of code relay 170, closed contacts 187 of relay C–3 and conductor 188, leading to terminal 3 on the In code box 132.

This process continues until one code relay has been energized and locked up in each of the first four columns. When relay C–4 deenergizes as a result of the operation of the selected code relay in column 4 a circuit is closed for energizing relay EG–1 (end of group 1 relay), this circuit extending through the winding of the relay over conductor 190, closed contacts of the operated code relay and closed contacts of the corresponding operated exclusion relay to ground. The setting up of the code on relays in the first four columns requires considerably less time than the entire duration of quadrant 1. When relay EG–1 operates as described it prepares a circuit for energizing relays RV and RV–1 and at the beginning of quadrant 2 these relays are energized over a circuit including their windings in parallel, conductor 191, normal contact of relay EG–2, contacts 192 of relay EG–1 and conductor 193 which now finds a path to ground through normal contacts 117 and operated contacts 194 and 195. The RV relays remain locked over this circuit until the end of quadrant 2 at which time contacts 194 open. A circuit now exists for energizing relay 196 (FIG. 8), this circuit extending through the winding of the relay over conductor 197, normal contact of relay EG–2, closed contacts 198 and 199 of the RV relays to conductor 193 and thence to ground over contacts 117, 194 and 195. Relay 196 in energizing closes an energizing circuit for relay C–10, extending through the relay winding, through normal contacts on all of the code relays in column 10 to conductor 200 and to ground at operated contacts of relay 196. Relay C–10 in energizing connects ground from contacts 201 over conductor 202 to input terminal 5 of the In code box 132 of the scrambler circuit. This ground is sent through the scrambler to one of the eight output leads from the Out code box 134, through a corresponding operated contact of one or other of the relays RV or RV–1 over the corresponding conductor of the group 205, operated contact of the transfer relay 105, normal contact of one of the exclusion relays in the alternate column and back over one of the leads in the group 210 through the corresponding operated contact of relay C–10 to the winding of the corresponding code relay of column 10, causing that code relay to operate.

The operation from this point on through the second group is entirely analogous to the operation already described for the relays of group 1. That is, the operation of the code relay in column 10 opens the energizing circuit for relay C–10, closes a circuit from conductor 200 over normal contacts of code relays in column 10 above the operated code relay, closed contact of the operated code relay, normal contact of relay C–10 and conductor 211, through normal contacts on the code relays of column 9 to the winding of relay C–9, causing that relay to operate. Ground for energizing exclusion relay 113 is supplied from front contact 201*a* of relay 196, rest contact 201*b* of relay C–10 to conductor 201*c* and from thence over contact of the operated code relay as before. The ground received from exclusion relay over the lower conductor and closed contact of operated code relay to conductor 202*a* is sent through contact 202*b* of column relay C–9 and over conductor 202*c* to terminal 6 of the In box 132 of the scrambler.

When the last column relay of the group, relay C–7, has been operated and releases after the operation of a code relay in column 7, the ground for energizing the corresponding exclusion relay is furnished from operated contacts 212 of relay 196, through normal contacts of relay C–7, conductor 213 and operated contacts of the energized code relay of column 7. When the last exclusion relay is operated in this manner it projects a ground back over the lowermost of the pair of horizontal conductors leading from that relay back to the code relays, through closed contact of the operated code relay in column 7, conductor 230, operated contacts 231 of set P–3, operated contacts 232 of set P–2, and normal contacts 233 of set P–1 of the timing circuit, conductor 295, to the winding of relay EG–2 (end of group 2 relay) causing that relay to operate. The operation of this relay breaks the energizing circuit of relay 196 and of the reversing RV relays, causing those relays to restore.

The interconnecting panel 150 is provided to allow of any desired scrambling of the leads between the code relays and exclusion relays.

At the beginning of quadrant 2, an energizing circuit is closed for relay 340 (FIG. 9) extending over conductor 341 to contacts 342 of set P–3 of the timing circuit of FIG. 6A. This relay remains energized until the end of quadrant 3 and while energized it extends leads 214 and 216 from commutator segments 9 and 11 to contacts of the alternate column of exclusion relays.

The time taken to set up the code on the code relays of columns 7, 8, 9 and 10 is much less than the length of the second quadrant, for example, one-half the length of the second quadrant. At the beginning of this quadrant commutator brush 72 begins to sweep over the commutator segments 1 to 10 and traverses the first ten segments in this quadrant. Before the brush 72 reaches commutator segment 9 all eight of the exclusion relays that were operated in quadrants 1 and 2 have been operated and locked so that commutator segment 9 is now connected through the back contact of one of the two remaining unoperated exclusion relays to the switching circuit of one of the two recorder-reproducer coils that have not been selected by the code relays. This connection from commutator segment 9 leads over conductor 214, operated contact on relay 340, conductor 215 to the normal contact of an unoperated exclusion relay in the alternate column, passing, if necessary, through the front contacts of one or more energized exclusion relays. (It is to be noted that while the exclusion relays are in process of being energized connections between commutator segment 9 and the various control circuits for the recorder-reproducer coils may be shifted a number of times but no further shifts in this connection are made after eight of the exclusion relays are energized and locked.)

As previously stated the commutator brush 72 will sweep over segments 11 to 20 in the third quadrant and the code relays in columns 7 to 10 as well as the exclusion relays in the alternate column will remain locked up until the end of quadrant 3. The transfer relays 105 release at the end of quadrant 2 due to the opening of contacts 120 of set P–2 of the timing circuit. Commutator segment 11 remains connected over conductor 216, front contact of relay 340, conductor 217 to normal contact of the other of the two unoperated exclusion relays in the alternate column. It will be noted that conductor 217 is brought to contacts of the top exclusion relay of the column while conductor 215 is brought to contacts of the bottom exclusion relay of the column. The locking circuit for the operated code relays in columns 7 to 10 is closed over a conductor 218, normal contacts 219 of the set P–1 of the timing circuit to ground. These relays, therefore, remain locked up until the end of the third quadrant.

As stated, at the end of the second quadrant the energizing circuit for transfer relays 105 is broken so that release of the transfer relays places the normal exclusion relays in condition to operate in conjunction with the code relays in the setting up of the next code. The locking circuit for code relays of columns 1 to 4 is opened at the end of quadrant 2 by the opening of contacts 140 of set P–4 of the timing circuit, thus removing ground from lead 139. These relays are assumed to release before contacts 222 close. In practice this may be done by providing a pair of relays controlled from respective contacts 140 and 222 and in turn closing the lead 139 to ground through the rest contact of either relay, and further locking each relay through multiple front contacts on all code relays of group 1. Since each of this pair of relays is energized for two quadrants in alternation with each other, the locking circuit for the energized code relays will find a path to ground at all times except at instants during transfer when both relays are momentarily energized, this interval being determined by the length of time it takes for all energized code relays of the group to open the multiple grounds referred to. This wiring has been omitted from FIG. 6A in the interest of simplicity of showing but is indicated in FIG. 6B to be referred to. The same wiring arrangement can be used for lead 218 of the second group of code relays.

Relay EG–1 became deenergized upon the restoration of the energized code relay of column 4 by the opening of its front contact connected to lead 190. The energizing circuit for relay C–1 is now closed over normal contacts of the restored code relays of column 1, conductor 126, normal contacts of relay EG–1, normal contacts 223 of set P–2 and operated contacts 224 of set P–3 and operated contacts 225 of set P–4 of the timing circuit. The code relays of columns 1 to 4 are, theretherefore, in readiness to have a code set up on them in the same manner as previously described. In this case the ground is supplied to terminal 1 of the In code box over lead 131 through normal contacts of transfer relays 105 in series, conductor 235 and normal contacts 236 of set P–2 of the timing circuit and conductor 129. As stated, while a code is being set up on this first group of code relays, a code that has been set up on the second group of code relays and alternate exclusion relays is being made use of for transmitting or receiving.

As the exclusion relays of the normal set are operated they lock up over conductor 226 and operated contacts 227 of set P–4 of the timing circuit.

The purpose of the reversing relays RV is to distribute output leads from the scrambler in one manner when the code relays of columns 1 to 4 are being operated and in a different manner when the code relays of the second group are being operated. As noted, the RV relays are normal when the first group of code relays are being operated and are energized when the second group of code relays are being operated. The scheme of wiring is such that when grounds come through from the scrambler successively on output leads 1, 2, 3, 4 and 5 and assuming the exclusion relays do not effect a redistribution of the connections, the selection of the code relays in group 1 is made in an order proceeding from the bottom row upwards (the RV relays being in this case normal). Under the same conditions except with the RV relays operated the selection of the code relays of group 2 begins with the uppermost row and proceeds downwards. This operation comes about from the interchange that is made between the leads in conductor group 205, depending upon whether the RV relays are operated or released. Thus, a ground coming in on conductor 1 from the scrambler unless otherwise directed by the exclusion relays selects recorder-reproducer coil F by the code relay in the second column, G by the code relay in the third column or H by the code relay of column 4. A ground coming in on this same conductor unless otherwise directed by the exclusion relays selects recorder-reproducer E by the code relay of column 10, D by the code relay of column 9, C by the code relay of column 8 and B by the code relay of column 7.

The following description assumes that the ground coming out of the Out code box 134 of the scrambler was on one of the leads 1 to 5. If in considering the operation of the code relays of column 1 the ground from the scrambler had been on lead 6, it will be noted that this lead does not extend to any of the code relays of column 1 since there are only five relays in column 1. Conductor 6 is connected through contacts 236 of relay C–1 to conductor 11 leading to selector switch 31, FIG. 3, of the scrambler. Switch 31 is one of three special switches 29, 30, 31 which are in the nature of over-flow switches for extending the ground coming in on any of the leads 9, 10, 11 through the respective switch 29, 30 or 31 to lower numbered leads in the group 133. Switch 31 is so wired that any ground coming in on conductor 11 is directed to one of leads 1 to 5 of the conductor group 133 since the bank terminals of switch 31 are wired to only conductors 1 to 5. The ground assumed on conductor 6 is, therefore, transferred to one of the leads 1 to 5 and causes, in the manner described, operation of one of the five code relays of column 1.

If the ground had originally come in on lead 7 it would have been transferred through contacts 237 of relay C–1 to lead 10 and to switch 30. The bank terminals of switch 30 are wired to the first six leads of group 133. The chances are that this ground, therefore, will come out on one of the first five leads. If, however, it should come out on lead 6 it will be transferred through contacts 236 as before to selector 31. If the original ground had come out on conductor 8 it would have been transferred through contacts 238 of relay C–1 to conductor 9 and to switch 29 the bank terminals of which are wired to leads 1 to 7. The chances are that this ground would come out on one of the first five leads but if it should come out on either lead 6 or 7 it will be transferred as before to one of the conductors 1 to 5 so that in any case a selection is made of one of the five code relays of column 1.

As noted, only the first five conductors of the group 133 are wired directly through contacts of the reversing relays RV. The second column of code relays can use grounds on any one of the first six conductors of the group 133. If a ground comes in on lead 6 while relay C–2 is operated, this ground is transferred through contacts 240 to conductor 241 which leads to contacts on the reversing relays, such that with the relays RV normal this ground is extended over conductor 242.

If, while relay C–2 is energized, the ground from the scrambler should come in over conductor 7, it is necessary to put this ground back over conductor 10 leading to switch 30 of the scrambler. This transfer is made in contacts 244 of relay C–2. If the ground from the scrambler had come in on conductor 8 while relay C–2 is operated, it is necessary to put this ground back into the scrambler over conductor 9 and this transfer is accomplished through closed contacts 245 of relay C–2. In either of the latter two cases the resulting ground is transferred to one of the first six conductors in the group 133 and results in the selection of one of the six code relays of column 2.

In a similar manner it will be noted that in the case of columns 3, 4, 7, 8 and 9, conductor 6 is transferred through operating contacts of the corresponding column relay to conductor 241 leading through contacts of the RV relays. In the case of column 10 conductor 6 is transferred to conductor 11 by contacts 246. Conductors 7 and 8, the only two remaining conductors over which grounds can be supplied from the scrambler, are either put back over conductors 9 and 10, if there is less than the corresponding number of code relays in the respective column, or are put back over one of the two conductors 247, 248 to contacts of the RV relays in the case of those columns containing respectively seven or eight code relays. Considering columns 4 and 7, for example, each of which contains eight code relays, conductor 7 is transferred over operated contacts of the corresponding column relay to conductor 248. It is seen, therefore, that a ground coming out of the scrambler on any one of the eight leads in the group 133 is directed into one of the ten leads in the group 205 corresponding to the ten exclusion relays of a set.

Referring to FIG. 3, the scrambler comprises the two code boxes 132 and 134 already referred to, five rotary selectors and the six relays shown in the lower part of the figure. The code boxes comprise eight vertical and eight horizontal conductor bars arranged so that a punched card inserted in the code box will make connection by means of resiliently operated contact pins between any horizontal and any vertical bar as more fully described in an application of F. G. Buhrendorf, Serial No. 450,418, filed July 10, 1942, except that in the present case eight instead of ten cross bars are used. These code boxes are provided to permit changing the code cycle and to disguise the internal wiring of the code selector switches. The cards have eight holes punched in them, one for each lead. The rule for punching these cards is that there shall be one hole in each of the eight horizontal rows and in vertical columns corresponding to the incoming and outgoing leads such that a ground on any incoming lead is fed through the scrambler in a different path from the ground on any other lead.

The six relays referred to comprise a pulsing relay 250 and five walking relays 251 to 255 which also aid in disguising the arc wiring. These will be described presently.

Five stepping magnets 261 to 265 are provided for the five selector switches, the special switches 29, 30 and 31, already referred to, being stepped by magnet 261 together with the five arms of the first selector switch. The stepping magnets 261 and 263, 264, 265 are energized whenever the relay 260 is energized and applies ground from 266 over the four corresponding contacts controlled by relay 260. Relay 260 is operated over lead 270 from front contact 271 of the RV relays and conductor 271′ whenever either of two paths to ground is closed through the timing circuit of FIG. 6A. The first path comprises operated contacts 272 of set P–1 and normal contacts 273 of set P–2. The other path comprises operated contacts 274 of set P–3 and normal contacts 275 of set P–4. It is thus seen that relay 260 is energized at the beginning of quadrant 2 and releases at the end of quadrant 2 over the second traced path and is again energized at the beginning, and released at the end, of quadrant 4 over the first traced path. These switches are stepped therefore at the end of quadrants 2 and 4.

Stepping magnet 262 is also operated by a contact of the relay 260 but only on condition that a ground exists on conductor 276. This occurs only when certain codes are set up. For example, with the wiring as shown a ground exists on conductor 276 only if one of the two lowest code relays of column 10 (for selecting recorder-reproducer H or I) is operated and closes corresponding contacts 277 or 278. Obviously the control could be made dependent upon any other more or less fortuitous condition, such as the setting up of a particular code.

The pulsing relay 250 for controlling the walking relays is energized under control of stepping relay 260 and slow-release relay 280. When stepping relay 260 is energized it causes relay 280 to pull up, and when relay 260 releases a momentary ground is transmitted over back contact of relay 260 and front contact of slow release relay 280 to the winding of pulsing relay 250, causing the latter to operate for a brief instant.

With the start key 119 pressed, relay 251 is energized over a circuit extending through the winding of relay 251, break contacts of relays 252 to 255, conductor 283, break contact of relay 251 to ground. Relay 251 locks up through break contact of relay 252 and made contact of upper armature of relay 251 to ground. On the first actuation of pulsing relay 250 relay 252 is energized over a path extending through its winding, lower armature and front contact of relay 251, operated contact 284 of relay 250, lower normal contact of relay 255, conductor 285, break contact of relay 252, upper armature and front contact of relay 251 to ground. This opens the locking circuit previously traced for relay 251 through break contact of relay 252. Relay 252 locks up over break contacts of relays 253, 254 and 255, conductor 283, and break contact of relay 251 to ground. In a similar manner on the next pulse relay 250 operates, restores relay 252 and causes relay 253 to operate and lock up, the circuit in this case extending through contact 286 of relay 250. On succeeding pulses relays 254 and 255 are successively operated and on the next pulse relay 251 is operated beginning a new cycle.

The eight conductors in the group 290 are wired in arbitrary manner through contacts controlled by the relays 251 to 255 to arms of the first three selector switches. For simplicity only some of this wiring is shown. No rule can be given for the wiring except that with any selector switch position there must always be one and only one path extending from any given conductor of the group 290 through to a conductor of the group 291 leading into the Out code box 134. A great variety of interconnecting schemes for the walking relays and selector switches is possible. It is understood, of course, that the wiring scheme must be duplicated in the other station or stations. The drawing shows for illustration that with a given condition for the relays 251 to 255, an output conductor from the code box 132 may lead to one of the arms of the first group of selector switches or may skip to one of the arms of second or third groups of selector switches. It could, of course, be provided that all conductors of the group 290 would in all cases be connected to arms of the first group of selector switches so that the connection would extend through all five switches in tandem as is the case with the one heavy line path indicated. However, a different code scheme is realized by connecting some of the conductors 290 in certain settings of the relays 251 to 255 so that they pass directly to arms of the second or third selector switches and the corresponding circuit extends through only four or three selector switches in tandem.

The wiring between the relay contacts and switch arms and also the wiring between the terminal banks of one switch and the arms of the next switch are only partially indicated in the drawing in order not to complicate the drawing unduly and further, since the wiring plan can be varied in many different ways, so long as a through-path is always provided and no confusion is produced by the crossing of paths. It is obvious that a great variety of wiring schemes is possible and the aim should be to provide the maximum number of non-recurring interconnecting cycles between the incoming and outgoing conductors.

As already noted, the three over-flow or reassignment switches 29, 30, 31 are wired so that in every position of the switches a ground fed back on one of conductors 9, 10 or 11 will find a path to an output lead 1 to 5 or 1 to 6 or 1 to 7 as may be required to operate a code relay in a given column.

It is believed that the operation of the scrambler is clear from the description already given. To recapitulate briefly, the scrambler switches are caused to move one step before the second group of code relays are to be selected for the setting up of a code. At this instant the stepping relay 260 releases causing the selectors 1, 3, 4, and 5 to take a step. Selector 2 also takes a step if at this time contact 277 or 278 of column 10 of the regular equipment is operated. The scrambler remains in a given setting until this point in the cycle comes around again. Thus the switches remain in a given position until eight ground circuits through the scrambler have been utilized for the setting up of a given code. Then the switches assume a different position for determining the next eight ground circuits.

It remains to be described how the system may be started. Keys (not shown) are provided for removing the ground 266 (FIG. 3) from the armatures of the stepping relay 260. Keys or other means are provided for enabling the five selector switches of each scrambler to be set manually to positions previously agreed upon. Since the ground 266 has been removed, the switches will remain in this setting as long as desired. The pulsing relay 250 is without ground also and remains quiescent. These steps are performed in both regular and interlace equipment at both sending and receiving stations. Duplicate punched code cards are inserted in the respective In code boxes and Out code boxes at both stations, in regular and interlace equipment. Assuming the master oscillators at both stations to be in synchronism, it is only necessary to phase the timing circuits of FIG. 6 and commutator brushes 72 at both stations, these latter being mechanically interconnected at the same station and adjustable together. Suitable mechanical phase shifting means of known type are provided at each station for adjusting the phase of the timing circuit and commutator brush until speech spoken over the system is properly decoded. At a signal agreed upon the keys mentioned in this paragraph are thrown to operating position and continuous coding starts in the manner that has been described.

Referring now to FIG. 6B, the various leads extending to the top of the figure correspond with those crossing the broken line 6B—6B in FIG. 6A, so that FIG. 6B can be substituted for the portion of FIG. 6A below this broken line.

The commutator 300 is the same as the commutator represented as spread out across the top of FIGS. 4 and 7. The wiring of the twenty segments is shown in FIGS. 4 and 7 and is omitted in FIG. 6B, since the distributor ring is reproduced in the latter figure merely to show the phase relation between the distributor segments and two timing segments 301 and 302 which are positioned to have ground applied to them as brush 72 rotates. These timing segments control the order of energization of four relays designated P1, P2, P3 and P4 which together with the contacts that they contol correspond to the four contact groups of FIG. 6A designated as P–1, P–2, P–3 and P–4. As the arm 72 rotates, the relays are energized in the order P1, P2, P3 and P4 a quadrant apart or, in terms of the distributor 300, a half cycle apart.

For example, with the brush arm just beginning to make contact with segment 301, a circuit is closed for energizing relay P1 extending from battery through the winding of the relay, conductor 304, armature 305 and rest contact of relay P2 and conductor 306 to segment 301 and grounded brush. Relay P1 locks up over armature 307 and its front contact and over armature 308 and rest contact of relay P3. (After any of the code relays of group 2, columns 7 to 10, are operated, a locking circuit also exists over conductor 309 to front contacts (not shown) multiplied to all code relays of group 2 from conductor 309.)

As brush arm 72 reaches segment 302, relay P2 is energized over a circuit including winding of this relay, conductor 310, armature 311 and front contact of relay P1, armature 312 and rest contact of relay P3 and conductor 313, and locks over armature 315 of relay P4 to ground. As the brush 72 again reaches segment 301 relay P3 is energized over a circuit including the relay winding, conductor 314, front contact and armature 305 of relay P2 and conductor 306. Relay P3 in energizing opens the locking circuit of relay P1 at the rest contact of armature 308 and relay P1 releases as soon as the alternative locking circuit over conductor 309 is opened by release of all of the group 2 code relays. It will be recalled that the locking circuit for this group of code relays extended over conductor 218 which is opened at the uppermost armatures and rest contacts of relays P1 and P3 when both relays are energized and, therefore, in the transition time between the energization of P3, as just described, and subsequent release of P1.

When the brush arm 72 next reaches segment 302, relay P4 energizes over conductor 314 and front contact closed by armature 312 of relay P3 to conductor 313. The locking circuit for relay P2 is now broken at armature 315 so that relay P2 releases as soon as all the code relays of group 1 are in released condition, thereby opening all of the paths to ground from conductor 316 through previously operated code relays of group 1. The locking circuit for the group 1 code relays extended through conductor 139 which is momentarily opened at armature 317 as relay P4 energizes and before relay P2 releases.

In this manner the four relays P1, P2, P3 and P4 are energized in succession and held energized for the duration of one quadrant indicated on the timing diagram of FIG. 6A.

The manner in which a circuit is closed through the relay contacts of these timing relays will be clear from the diagram in FIG. 6A although the order in which the contacts occur in following along a given circuit may be different. Taking the conductor 129 as an example, the contacts 122 and 236 are designated on both figures and can readily be identified. Considering conductor 193, this conductor is connected to ground when relay P5, FIG. 6B, is energized. This relay is energized whenever either of the following two paths is closed: (1) front contact of armature 320 of relay P3, front contact and armature 321 of relay P2, rest contact and armature 322 of relay P1, or (2) rest contact and armature 320, front contact and armature 323 of relay P4 and front contact and armature 322 of relay P1. In other words, path 1 is closed when relays P3 and P2 are operated and P1 is normal, while path 2 is closed when P3 is normal and P1 and P4 are operated. For simplicity in FIG. 6A the relay P5 is omitted and conductor 193 is indicated as having a path to ground when either (1) P–3 and P–2 are operated and P–1 is normal or (2) when P–3 is normal and P–1 and P–4 are operated. With this explanation, the correspondence between the diagram in FIG. 6A and the relay circuit in FIG. 6B should be clear without further description.

What is claimed is:

1. In a speech privacy system, a transmission path, a speech storage element, a plurality of reproducers cooperating with said storage element, to reproduce portions of the stored speech with different amounts of delay, a distributor for effecting connection of said reproducers into the transmission path in succession, and coding mechanism interposed between said plurality of reproducers and distributor comprising means for continuously changing among themselves the individual connections of said reproducers to alter the order in which the reproducers are connected into the transmission path.

2. A speech privacy system according to claim 1, in which said coding mechanism comprises a scrambler having a plurality of control leads for controlling said individual connections of said reproducers, said scrambler comprising means for setting up a control condition on said leads successively in arbitrary order within a code cycle and for changing the order from cycle to cycle.

3. A speech privacy system according to claim 1, in which said coding mechanism includes individual switching means for controlling said individual connections of said reproducers and a cyclically operating scrambler for primarily determining an arbitrary order of operation of the individual switching means in each cycle, said order varying from cycle to cycle, and exclusion means for secondarily determining the order of operation of said switching means.

4. A speech privacy system according to claim 1, in which said coding mechanism includes individual switching means for controlling said individual connections of said reproducers, a scrambler for controlling operation of said individual switching means in arbitrary order within one code cycle and in different arbitrary orders in successive code cycles, and an exclusion circuit for at times modifying said order under control of the preceding operation of said individual switching means within the same code cycle.

5. In a speech privacy system, a transmission path, a speech storage element, a plurality of reproducers cooperating with said storage element to reproduce portions of the stored speech with different amounts of delay, switches for connecting said reproducers individually to said path, and coding mechanism operating in cycles to actuate said switches in arbitrary order within an operating cycle and in a changing order from cycle to cycle, said mechanism including means to preselect said switches in arbitrary order and means controlled from said preselecting means for actuating said switches.

6. In a speech privacy system, a receiving channel over which scrambled speech segments are received, a speech storage element, a plurality of recorders cooperating with said storage element to record respective portions of the received scrambled speech on said storage element whereby they may be reproduced with different amounts of delay, switches for connecting said recorders individually with said receiving channel, and coding mechanism operating in cycles to actuate said switches in a mechanically predetermined order within one cycle of operation in agreement with the scheme of scrambling of the received scrambled speech and in a changing order from cycle to cycle to restore said scrambled speech segments to normal.

7. In a speech privacy system, a speech message circuit, a plurality of circuit devices adapted when actuated in different time orders to produce scrambling of said speech message in varying schemes of scrambling, a scrambler for determining a succession of arbitrary, non-repetitive time orders for controlling actuation of said devices, some only of said time orders being unsuited for use, and means controlled by said scrambler to in turn control actuation of said devices in accordance with the successive time orders determined by said scrambler, said means including circuit means for discarding said unsuited time orders.

8. In a speech privacy system including a transmitting station and a receiving station, coding means at the transmitting station to break speech message waves into short fragments and to send out the fragments in rearranged time order, decoding means at the receiving station for receiving said speech fragments and rearranging them in their normal order, duplicate code generators at said stations for separately producing continuously changing code determining controls duplicated at said two stations, and means to actuate said respective coding and decoding means by said respective controls including means at each station to discard controls that would result in impairment of message transmission.

9. In a speech privacy system, a circuit carrying normal speech message waves, a path for scrambled speech message waves, means interposed between said circuit and path for either scrambling normal speech for transmission or unscrambling received scrambled speech according as speech is to be transmitted or received, said means comprising a plurality of circuit devices adapted to be actuated in changing time orders, coding means for determining in advance of use each such time order, said coding means operating in cycles to determine a time order varying from cycle to cycle, and means for actuating said devices in accordance with the time order determined by said coding means.

10. In a speech privacy system, means to break speech message waves into short fragments and to transmit said fragments in abnormal time order, said means comprising a plurality of devices adapted to be actuated in time sequence, coding mechanism adapted to be set in advance of use to determine a given time sequence of actuation of said devices, a rotary distributor for actuating said devices in the time sequence determined by the setting of said coding mechanism, and means for setting up a different code on said coding mechanism for each rotation of said distributor.

11. A privacy system according to claim 10, comprising two coding mechanisms, and means to set up a code on either of said mechanisms while said rotary distributor is actuating the devices in accordance with the code set up on the other of said coding mechanisms.

12. In a speech privacy system, a speech storage element, a plurality of recorders cooperating therewith to record received speech with different time delay, a circuit for received speech transmitted with privacy and consisting of fragments of normal speech rearranged in time in abnormal order, a rotary distributor for effecting connection between said circuit and said individual recorders in given time sequence and decoding means operatively related to said distributor and recorders for determining in each rotation of said distributor a different sequential order of connection between said circuit and individual recorders such as to restore the received speech to normal.

13. In a speech privacy system having a transmitting station and a receiving station and a transmission channel therebetween, speech storage means at each station, a speech recorder and succession of speech reproducers associated with the storage element at the transmitting station to enable the speech to be delayed different amounts in the successive reproducers, a corresponding succession of speech recorders associated with the storage element at the receiving station and a reproducer also associated with the storage element to enable portions of a speech message to be delayed different amounts in reception, a rotary distributor at each station operating in synchronism, for effecting connection between said transmission channel and reproducers and recorders at the respective stations, and duplicate coding means at respective stations operatively related to said distributors and, respectively, said reproducers and recorders, for determining the sequence in which said connections are made at the respective stations between the individual reproducers and recorders and said channel, said coding means each determining a different sequential order of said connections in each rotation of said distributor throughout a large number of distributor rotations, the sequential order of said connections at the two stations always being such as to recover normal speech in the reproducer at the receiving station.

14. In a speech privacy system, a speech storage element having speech input and output connections and including a plurality of cooperating devices capable of individual control to effect successively greater amounts of delay between the speech put into said input terminals and the speech appearing at said output terminals, groups of code relays individually capable of controlling said devices to effect different amounts of speech delay, means to energize certain selected code relays to prepare a succession of control circuits for controlling said devices in given sequential order and a rotary distributor for closing said prepared control circuits in timed sequence.

15. A privacy system according to claim 14, comprising a scrambler for selectively energizing said code relays in an arbitrary order, and a set of exclusion relays for modifying the selection of code relays by said scrambler.

16. A privacy system according to claim 14, comprising a scrambler having a plurality of output terminals, timing means for connecting said terminals to one after another of said groups of code relays to enable selective energization of a relay out of each group under control of said scrambler, and a set of exclusion relays common to said groups of code relays, the connections between said scrambler terminals and code relays passing through controlled contacts of said exclusion relays.

17. In a speech privacy system, a transmission path, means including a timing circuit for subdividing speech message waves into fragments on a time basis, code relays for determining the order in which the speech fragments are to be sent over said transmission path, a scrambler operating in timed relation to said timing circuit for selecting code relays for operation in advance of the transmission of said speech fragments, and means operated by said timing means for effecting transmission of said speech fragments over said path under control of the operated ones of said code relays.

18. In a telephone privacy system, a plurality of devices for effecting respectively different amounts of delay in speech transmission, a plurality of sets of code relays, a scrambler, means to operatively associate the first set of code relays with said scrambler to cause the scrambler to select and operate one of the relays of said set, said operated relay selecting for subsequent operation one of said devices, means for thereafter operatively associating the next set of code relays with said scrambler to cause the scrambler to select and operate one of the relays of said latter set, said operated relay of said latter set selecting for operation a different one of said devices for subsequent operation, means for similarly operatively associating said scrambler with other sets of said code relays to cause operation of a selected relay in each such set for selecting others of said devices for subsequent operation, and timing means for sequentially operating the selected devices to cause the transmission of speech portions with varying amounts of delay.

19. In a telephone privacy system, a plurality of devices for effecting respectively different amounts of delay in speech transmission, a scrambler having a set of input leads and a set of ouptut leads and including means for interconnecting the input leads with the output leads in irregular order, sets of code relays, a column relay per set of code relays, means for operating said column relays in sequence, means controlled by each column relay when operated to place the code relays of the corresponding set under control of said scrambler and to energize one of said input leads and thereby cause an output lead determined by the scrambler to operate one of the code relays of the last-mentioned set, said operated relays selecting for operation one of said devices, and means operating after the selection of a plurality of said devices to operate such selected devices in timed sequence.

References Cited in the file of this patent

UNITED STATES PATENTS

| | | |
|---|---|---|
| 1,325,574 | Nichols | Dec. 23, 1919 |
| 1,605,023 | Hartley | Nov. 2, 1926 |
| 1,676,321 | Carpe | July 10, 1928 |
| 1,809,070 | Schapira | June 9, 1931 |
| 2,094,132 | Miller | Sept. 27, 1937 |